United States Patent Office 2,766,173
Patented Oct. 9, 1956

2,766,173
ALKYLAMINO 2-OXY-3-NAPHTHOAMIDE ANESTHETIC COMPOSITIONS

William M. Ziegler, Clementon, N. J., and George M. Sieger, Pearl River, N. Y., assignors to Heyden Chemical Corporation, New York, N. Y., a corporation of Delaware No Drawing. Application March 12, 1953,
Serial No. 342,012

8 Claims. (Cl. 167—52)

The present invention relates to anesthetics and to compositions containing such anesthetics. More particularly, the present invention is concerned with the discovery of certain novel substituted amides which produce anesthesia when administered parenterally or topically.

We have discovered certain mono and dialkylaminoalkyl 2-oxy-3-naphthoamide compounds which are desirable anesthetics and which are stable in solution over an extended period. These substituted amides may be represented by the following formula:

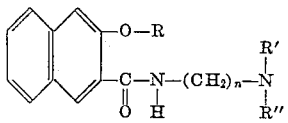

where

R is hydrogen or an alkyl radical containing from 1 to 6 carbon atoms,
R' is hydrogen or an alkyl radical containing from 1 to 4 carbton atoms,
R'' is an alkyl radical containing 1 to 4 carbon atoms, and
$n$ is 2 or 3.

These compounds may be used as the base having the above formula or as the monovalent or divalent organic or inorganic acid salt of the base. In the acid salts, the acid is connected to the nitrogen in the terminal amino group as follows:

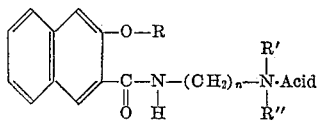

Thus, the acid salts are addition salts each containing the base without modification. The acid is connected to the base without substitution or replacement. The acid salts may for example be the tartrate, bitartrate, acetate, citrate, maleate, malate, bimaleate, methane-sulfonate, sulfate, phosphate or hydrobromide. A mole of an acid such as sulfuric acid will react with 2 moles of the base to form a sulphate having the following formula and which is a divalent salt.

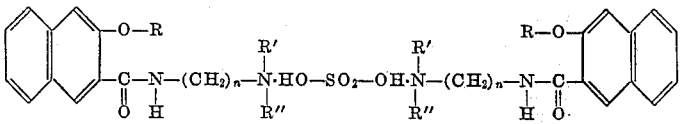

All of these bases and acid salts may be considered as having the following structural formula:

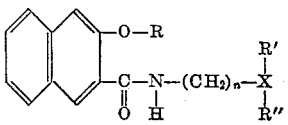

where

R is a member selected from the group consisting of H and an alkyl radical containing from 1 to 6 carbon atoms,
R' is a member selected from the group consisting of H and an alkyl radical containing 1 to 4 carbon atoms,
R'' is an alkyl radical containing 1 to 4 carbon atoms, and
$n$ is a whole number selected from the numbers 2 and 3,
X is a member selected from the group consisting of N and N·Acid.

As used herein the term "acid salt" includes the salts with limitation to the valence or number of amide base radicals joined to the acid.

It is the general practice to use anesthetics in aqueous solution and the acid salts are preferred for the reason they are water soluble and may be readily dissolved in water to form aqueous solutions containing up to 15%, or more, by weight of the anesthetic. Doctors are accustomed to using aqueous solutions containing relatively smaller amounts of anesthetic and accordingly, solutions are preferably used containing not more than 5% of the anesthetic with solutions containing about 1% or 2% of the anesthetic being generally used. Aqueous solutions have been successfully used containing as little as 0.05% anesthetic. Although weaker solutions may be used, solutions containing at least about 0.1% are preferred to avoid using larger amounts of the solutions. The amount of solution required depends on the amount of anesthetic present and if the percentage of anesthetic is too low the amount of the solution required may become excessive.

The alkylaminoalkyl 2-oxy-3-naphthoamides may be readily used as the base in products having, for example, an oily nature. The base or base portion of the acid salt produces anesthesia, the acid only rendering the anesthetic water soluble. The bases, in general, are insoluble in water but are soluble or compatible with oils and greases so that the bases can be readily used in ointments or creams, in water-in-oil or oil-in-water emulsions as can the acid salts. Such ointments or creams may contain the base or salt in widely varying amounts although, in general, they will contain the amount of salt or base described in connection with the aqueous solutions. The substituted amides may, of course, be used singly or in combination.

While anesthetic compositions can be readily prepared containing from 0.05% up to 15% of one or a mixture of the present amides, either as the base or salt, preferably such compositions contain from 0.5% to 5% with 1% to 2% being the amount of amide generally used. As used herein the amides include both the bases and salts unless modified by the term "base" or "salt."

The present anesthetics may be readily prepared as the hydrochloride salts by reacting together the desired substituted naphthoyl chloride with the desired mono or dialkylaminoalkylamine in an inert solvent. This reaction may be indicated in a general way as follows:

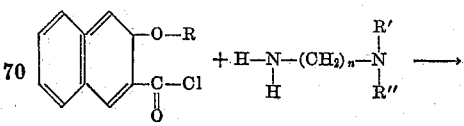

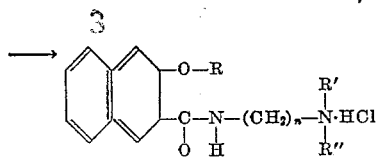

The substituted naphthoyl chloride may be prepared by reacting the corresponding 2-oxy-3-naphthoic acid with thionyl chloride and this reaction may be effected in the same or a different inert solvent in which the substituted naphthoyl chloride is converted to the dialkylaminoalkyl-2-oxy-3-naphthoamide. Preparation of the naphthoyl chloride may be indicated in a general way as follows:

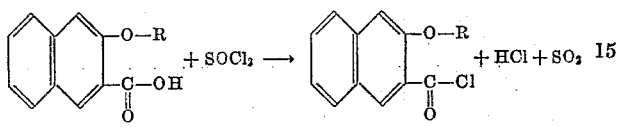

The hydrochloride salt may be readily converted to the base by treatment with an alkaline compound such as ammonia. The base can be in turn converted to a different acid salt by reacting the base with the different acid.

The following examples illustrate the present invention which is not limited to the particular materials or conditions of the examples except as specifically set forth in this description or in the claims.

EXAMPLE I

β-Diethylaminoethyl 2-hydroxy-3-naphthoamide hydrochloride was prepared by gradually adding 40 grams of 2-hydroxy-3-naphthoyl chloride to 23 grams of beta-diethylaminoethylamine in 200 milliliters of chloroform. The solution was maintained just below the boiling point by the addition of the chloride. The solution was then allowed to stand for two days and thereafter sufficient chloroform was removed by evaporation to reduce the solution to half its volume. The concentrated solution was seeded with crystals of diethylaminoethyl 2-hydroxy-3-naphthoamide hydrochloride. The pasty mass that formed was mixed with two volumes of isopropanol and chilled. The precipitated crystals were separated by filtration and the crystals purified by re-crystallization from isopropanol. The actual yield was 46 grams which corresponds to 70% of the theoretical yield.

EXAMPLE II

β-Diethylaminoethyl 2-hydroxy-3-naphthoamide hydrochloride was prepared by adding 40 grams of 2-hydroxy-3-naphthoyl chloride to 23 grams of beta-diethylaminoethylamine dissolved in benzene. The mixture was refluxed for one hour. An oil precipitated which became crystalline on standing. The oily crystalline material was purified by adding the material to isopropanol to obtain a solution and then chilling the solution to precipitate purified crystals. The yield was 69% of theoretical.

EXAMPLE III

β-Diethylaminoethyl 2-ethoxy-3-naphthoamide hydrochloride was prepared by reacting 7.5 grams of diethylaminoethylamine and 15 grams of 2-ethoxy-3-naphthoyl chloride in chloroform as described in Example I. The solvent was removed from the oil by evaporation and the oil allowed to stand until it had crystallized. This crystalline material was re-crystallized from a 2–1 mixture of ethyl acetate and isopropanol.

EXAMPLE IV

Seven and six-tenths grams of thionyl chloride were added to 12 grams of 2-butoxy-3-naphthoic acid suspended in 50 milliliters of benzene and the mixture refluxed for five hours under anhydrous conditions to form 2-butoxy-3-naphthoyl chloride. Half the solvent was removed under partial vacuum and the concentrate cooled. After cooling, 16 grams of diethylaminoethylamine dissolved in 160 milliliters of benzene were added to the concentrate with stirring. The resulting mixture was refluxed for three hours and then concentrated to one-quarter its original volume under partial vacuum. On standing, crystalline β-diethylaminoethyl 2-butoxy-3-naphthoamide hydrochloride precipitated. The precipitated crystals were separated from the mother liquor by filtration. An additional quantity of the naphthoamide was obtained from the mother liquor by further concentrating the liquor by evaporation and allowing the concentrated liquor to stand. The second crop of crystals were purified by re-crystallization in aqueous isopropanol. The total yield was 12.4 grams which corresponds to 72% of the theoretical yield.

EXAMPLE V

To 26 grams of γ-diethylaminopropylamine dissolved in 250 ml. of benzene was added slowly 41.2 grams of 2-hydroxy-3-naphthoyl chloride. The mixture was then refluxed for two hours and allowed to cool. The benzene was decanted from the oily layer which was washed again with benzene by decantation. The remainder of the solvent was removed under vacuum. The oil was dissolved in 300 ml. of chloroform and treated with activated carbon. After filtration the solvent was removed in vacuo and the product dried over sulfuric acid. The yield was 52 grams, 77% of theoretical, of amorphous γ-diethylaminopropyl 2-hydroxy-3-naphthoamide hydrochloride.

EXAMPLE VI

The acid chloride was prepared by adding to 21.6 grams of 2-ethoxy-3-naphthoic acid, suspended in petroleum ether, 7.5 ml. of thionyl chloride and refluxing six hours, then cooling. To the 2-ethoxy-3-naphthoyl chloride in petroleum ether was added 32.6 grams of γ-diethylaminopropylamine dissolved in 200 ml. benzene and the mixture refluxed three hours. The solvent was then removed under diminished pressure. The γ-diethylaminopropyl 2-ethoxy-3-naphthoamide hydrochloride was dissolved in 250 ml. of 20% aqueous hydrochloric acid and treated with charcoal, then filtered. The filtrate was treated wtih an excess of 20% ammonium hydroxide to form the base. An oil separated which solidified after some time of stirring. The solid was re-crystallized from benzene-petroleum ether (1–3) mixture. The yield was 25–26 grams or 78% of theoretical of γ-diethylaminopropyl 2-ethoxy-3-naphthoamide.

EXAMPLE VII

γ-Diethylaminopropyl 2-butoxy-3-naphthoamide hydrochloride was prepared from thionyl chloride, 12.2 grams of 2-butoxy-3-naphthoic acid and 16.3 grams of γ-diethylaminopropylamine and then treated with ammonium hydroxide to form the base in substantially the same manner as described in Example VI. The oil that separated, crystallized and was then filtered. The crystals were washed with water and dried. The yield was 13.4 grams or 75% of theoretical of γ-diethylaminopropyl 2-butoxy-3-naphthoamide base.

EXAMPLE VIII

To a solution of 10.2 grams of γ-dimethylaminopropylamine in 100 ml. of benzene was added, slowly and with stirring, 20.6 grams of 2-hydroxy-3-naphthoyl chloride dissolved in 200 ml. of benzene. After standing overnight the solvent was removed by evaporation. The oil was treated with 400 ml. 10% ammonium hydroxide with warming and stirring to convert the hydrochloride to the base. The oil turned into a yellow crystalline material. This was re-crystallized from aqueous isopropanol. The yield was 16 grams or 59% of theoretical of γ-dimethylaminopropyl 2-hydroxy-3-naphthoamide base.

EXAMPLE IX

γ-Dimethylaminopropyl 2-butoxy-3-naphthoamide base was prepared from 12.2 grams of 2-butoxy-3-naphthoic acid and 12.8 grams of γ-dimethylaminopropylamine just as the diethylaminopropyl derivative was prepared in Example VI except that the acid chloride was prepared in benzene. The product was recrystallized from benzene-petroleum ether mixture. The yield was 10 grams or 60% of theoretical.

While the preceding examples are concerned with the dialkylaminoalkyl naphthoamides, the monoalkylaminoalkyl compounds can be similarly prepared where the nitrogen atom of the terminal amino group is connected to a hydrogen atom and one alkyl radical as in, for example isopropylaminoethyl 2-hydroxy-3-naphthoamide having the following formula:

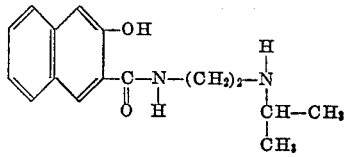

EXAMPLE X

To a solution of 11.5 grams of γ-isopropylaminopropylamine in 100 ml. of chloroform was added 20.6 grams of 2-hydroxy-3-naphthoyl chloride portionwise over 15 minutes. The mixture was refluxed for six hours, cooled, and filtered. The filtrate was evaporated to about ⅓ its volume and acetone was added (about 100 cc.). The crystalline material was filtered off, washed with acetone, and dried. The product was re-crystallized from ethanol-ether (1–3) mixture. The yield was 13 grams or 40% of theoretical of γ-isopropylaminopropyl 2-hydroxy-3-naphthoamide hydrochloride.

Substituted naphthoamides prepared as described in the preceding examples had the following physical constants:

*Table I*

| Product | Melting Point, degrees | Analysis | | | |
|---|---|---|---|---|---|
| | | Found | | Calc'd | |
| | | N, Percent | Cl, Percent | N, Percent | Cl, Percent |
| β-Diethylaminoethyl 2-hydroxy-3-naphthoamide hydrochloride | 156.5–157.6 | 8.6 | 11.0 | 8.7 | 11.0 |
| β-Diethylaminoethyl 2-ethoxy-3-naphthoamide hydrochloride | 150.5–154.5 | 7.7 | 10.0 | 8.0 | 10.1 |
| β-Diethylaminoethyl 2-butoxy-3-naphthoamide base | 75–77 | 8.1 | | 8.2 | |
| γ-Diethylaminopropyl 2-hydroxy-3-naphthoamide hydrochloride | | 8.1 | 10.4 | 8.3 | 10.6 |
| γ-Diethylaminopropyl 2-ethoxy-3-naphthoamide base | 59.8–60.9 | 8.4 | | 8.5 | |
| γ-Diethylaminopropyl 2-butoxy-3-naphthoamide base hydrochloride hydrate [1] | 53–55 / 135–136 | 7.6 / 6.7 | / 8.6 | 7.9 / 6.8 | / 8.6 |
| γ-Dimethylaminopropyl 2-hydroxy-3-naphthoamide base | 153–155 | 10.1 | | 10.3 | |
| γ-Dimethylaminopropyl 2-butoxy-3-naphthoamide base | 81–83 | 8.6 | | 8.5 | |
| γ-Isopropylaminopropyl 2-hydroxy-3-naphthoamide hydrochloride | 205.7–207.1 | 8.5 | 11.2 | 8.7 | 11.0 |

[1] H₂O percent; found 5.0; calc'd 4.4.

A standard method of testing the effectiveness of compounds as surface anesthetics involves flooding a rabbit's cornea with a solution of the compound in question and testing at intervals the rabbit's corneal reflex to light and pressure. The length of the period before there is a reflex action in response to stimulation is an indication of the effectiveness. In the following table a 0.05% aqueous solution was used and the duration of anesthesia is the average duration in minutes.

*Table II*

| Product | Duration in Minutes |
|---|---|
| β-Diethylaminoethyl 2-hydroxy-3-naphthoamide [1] | 28 |
| β-Diethylaminoethyl 2-ethoxy-3-naphthoamide [1] | 32 |
| γ-Diethylaminopropyl 2-hydroxy-3-naphthoamide [1] | 23 |
| β-Diethylaminoethyl 2-butoxy-3-naphthoamide [2] | 58 |
| γ-Diethylaminopropyl 2-butoxy-3-naphthoamide [2] | 40 |
| γ-Dimethylaminopropyl 2-butoxy-3-naphthoamide [2] | ([3]) |
| γ-Diethylaminopropyl 2-ethoxy-3-naphthoamide [2] | 41 |
| γ-Isopropylaminopropyl 2-hydroxy-3-naphthoamide [1] | 17 |
| γ-Dimethylaminopropyl 2-hydroxy-3-naphthoamide [2] | 3 |
| Procaine [1] | 1 |

[1] These compounds used as the hydrochloride.
[2] These compounds dissolved in aqueous acetic acid containing one molecular equivalent of acid which formed the acetate salt.
[3] An effective anesthetic but irritating.

All of the present compounds were more effective in this topical administration than procaine hydrochloride.

The following table, Table III, shows the results of a retrobulbar block test in which 0.2 cc. of a 0.1% solution was injected through the eyelid into the back of the eye. Then the period of pupillary dilation and failure to respond to light was measured in minutes as was the period of no corneal reflex to stimulation. The values in Table III are average values.

*Table III*

| Product | Pupillary dilation and failure to respond to light | Corneal Reflex |
|---|---|---|
| β-Diethylaminoethyl 2-hydroxy-3-naphthoamide [1] | 18 | 10 |
| β-Diethylaminoethyl 2-ethoxy-3-naphthoamide [1] | 28 | 22 |
| γ-Diethylaminopropyl 2-hydroxy-3-naphthoamide [1] | 44 | 8 |
| β-Diethylaminoethyl 2-butoxy-3-naphthoamide [2] | 90 | 60 |
| γ-Diethylaminopropyl 2-butoxy-3-naphthoamide [2] | 57 | 27 |
| γ-Dimethylaminopropyl 2-butoxy-3-naphthoamide [2] | 65 | 67 |
| γ-Diethylaminopropyl 2-ethoxy-3-naphthoamide [2] | 52 | 30 |
| Procaine [1] | 17 | 11 |

[1] Used as the hydrochloride.
[2] Dissolved in one mole equivalent of acetic acid to form the acetic acid salt.

The following table, Table IV, indicates that the present substituted amide anesthetics are no more toxic than cocaine and much less toxic than other similar amide anesthetics such as, diethylaminoethyl 2-butoxycinchoninamide (Nupercaine). The approximate $LD_{50}$ factor is that quantity expressed as milligrams per kilogram of mouse which will kill 50% of the mice injected subcutaneously. Thus, the higher the factor the lower the toxicity.

*Table IV*

| Compound | Approx. $LD_{50}$, mg./kg. |
|---|---|
| β-Diethylaminoethyl 2-hydroxy-3-naphthoamide | 600 |
| β-Diethylaminoethyl 2-ethoxy-3-naphthoamide | 475 |
| β-Diethylaminoethyl 2-butoxy-3-naphthoamide | 130 |
| γ-Diethylaminopropyl 2-hydroxy-3-naphthoamide | 725 |
| γ-Diethylaminopropyl 2-ethoxy-3-naphthoamide | 165 |
| γ-Diethylaminopropyl 2-butoxy-3-naphthoamide | 125 |
| γ-Dimethylaminopropyl 2-butoxy-3-naphthoamide | 175 |
| Procaine | 425 |
| Diethylaminoethyl 2-butoxycinchoninamide | 10 |
| Cocaine | 125 |

While all of the present amides are effective anesthetics, the 2-hydroxy compounds are preferred as they are least toxic and are less toxic than procaine.

A further indication of the value of the present amides as anesthetics is obtained by multiplying the $LD_{50}$ factor Table IV by the time of retrobulbar block anesthesia, Table III left column. Table V sets forth such an efficiency rating obtained by dividing the product by $10^{-4}$.

Table V

| Anesthetic | Efficiency |
| --- | --- |
| β-Diethylaminoethyl 2-hydroxy-3-naphthoamide | 1.08 |
| β-Diethylaminoethyl 2-ethoxy-3-naphthoamide | 1.33 |
| β-Diethylaminoethyl 2-butoxy-3-naphthoamide | 2.70 |
| γ-Diethylaminopropyl 2-hydroxy-3-naphthoamide | 3.20 |
| γ-Diethylaminopropyl 2-ethoxy-3-naphthoamide | 0.86 |
| γ-Diethylaminopropyl 2-butoxy-3-naphthoamide | 0.72 |
| Procaine | 0.72 |

Diethylaminoethyl 2-hydroxy-3-naphthoamide hydrochloride was tested to determine its effect on the kidneys, adrenals and liver of rats as compared to procaine hydrochloride. Ten rats, five for each anesthetic, were each injected subcutaneously daily for five successive days with 3.0 ml. of a 0.5% aqueous solution which corresponded to 120 mg. of anesthetic per kilogram of rat. Six hours after the last injection, the rats were killed and the kidneys, adrenals and livers were subjected to histopathological study. There were no pathological changes of significant magnitude in the organs that might be related to toxic effect. There was a complete absence of cytonecrosis, vascular injury or interstitial nephritis further indicating the absence of any significant toxic effect.

Tests were made to evaluate the muscle irritation caused by the present substituted amide anesthetics as compared to 2,6-dimethylphenyl diethylaminoethylacetamide hydrochloride. Solutions containing 0.5% and 1% each of β-diethyl aminoethyl 2-hydroxy-3-naphthoamide were prepared and one milliliter of each solution was injected into the sacrospinalis muscle of the rabbit. Four sites were used and the sites were rotated so that each rabbit received each anesthetic in one site. Part of the rabbits were sacrificed four days after injection and the remaining rabbits were sacrificed after seven days. Sections of the muscles were examined and there was no noticeable variation in degrees of muscle necrosis, reactive inflammatory changes, fibrocapillary proliferation and vascular and nerve degeneration in the various specimens. Thus, the substituted amide is no more irritating than 2,6-dimethylphenyl diethylaminoethylacetamide hydrochloride.

The following tables, Table VI to Table VII, show the results of various anesthesia studies on guinea pigs and rabbits with β-diethylaminoethyl 2-hydroxy-3-naphthoamide hydrochloride.

Retrobulbar block anesthesia tests were made on guinea pigs with 0.1% aqueous solutions of various anesthetics. The volume injected was 0.2 cc. and the results are set forth in Table VI.

Table VI
RETROBULBAR BLOCK IN GUINEA PIGS

| Local Anesthetic | Pupillary Failure To Respond To Light, Minutes | | Corneal Anesthesia, Minutes | |
| --- | --- | --- | --- | --- |
| Procaine Hydrochloride (with Epinephrine 1:100,000) | 17<br>14<br>16<br>25<br>25<br>17<br>23 | Av.=19 | 0<br>0<br>0<br>0<br>19<br>0<br>14 | Av.=3 |
| Xylocaine[1] Hydrochloride (with Epinephrine 1:100,000) | 26<br>24<br>30<br>36<br>31 | Av.=28 | 18<br>13<br>19<br>29<br>12 | Av.=18 |
| Diethylaminoethyl 2-hydroxy-3-naphthoamide hydrochloride (with Epinephrine 1:100,000) | 60<br>68<br>47<br>46<br>62<br>62 | Av.=58 | 30<br>27<br>21<br>20<br>35<br>62 | Av.=33 |

[1] Xylocaine is 2,6-dimethylphenyl diethylaminoethylacetamide.

Surface anesthesia studies were made on rabbits with various anesthetics. Each anesthetic in a 0.5% aqueous solution was instilled into the conjunctival sac of the eye and the corneal reflex tested by tactile stimulation. The results of these tests are set forth in Table VII.

Table VII
CORNEAL ANESTHESIA IN RABBITS

| Local Anesthetic | Anesthesia in Minutes | |
| --- | --- | --- |
| | Onset | Duration |
| Procaine Hydrochloride | | 1.0 |
| Xylocaine[1] Hydrochloride (with Epinephrine 1:250,000) | 2.0<br>6.0<br>1.0<br>1.0 Av.=2.5<br>4.0<br>4.0<br>3.5<br>3.5<br>3.0<br>3.0<br>2.0<br>2.5<br>4.0<br>5.0 | 18.5<br>12.0<br>33.0<br>26.0 Av.=22.5<br>32.0<br>32.0<br>38.0<br>44.0<br>38.0<br>35.0<br>26.0<br>28.0<br>16.0<br>26.0 |
| β-Diethylaminoethyl 2-hydroxy-3-naphthoamide hydrochloride | 2.5<br>3.0<br>3.5<br>4.0<br>6.0<br>5.0<br>3.0<br>1.0<br>1.0<br>4.0<br>1.5<br>1.5 Av.=3.2 | 13.5<br>20.0<br>24.0<br>21.0<br>45.0<br>41.0<br>43.0<br>49.0<br>20.0<br>36.0<br>21.0<br>21.0 Av.=30.5 |

Comparative studies of infiltration anesthesia were made in the guinea pig by intradermal injections of aqueous solutions containing 0.05% and 0.1% each of various anesthetics. The duration of anesthesia was measured by stimulating the injected area. The results are shown in Table VIII.

Table VIII
INFILTRATION ANESTHESIA IN GUINEA PIGS

| Local Anesthetic | Duration in Minutes | |
| --- | --- | --- |
| | 0.05% | 0.1% |
| Procaine Hydrochloride | 37<br>12<br>15<br>29<br>12<br>28<br>12<br>6<br>20<br>10<br>19<br>19<br>25 Av.=19 | 75 |
| β-Diethylaminoethyl 2-hydroxy-3-naphthoamide hydrochloride | 42<br>23<br>30<br>28<br>33<br>33<br>24<br>18<br>18<br>31<br>26<br>45<br>60<br>67 Av.=34 | 122 |

In addition to being good anesthetics for animals, the present substituted amide bases and the acid salts of these bases produce anesthesia when applied to humans. The present anesthetics may be used parenterally or topically with humans. These substituted amides may be used as surface anesthetics and may be applied to the skin where broken, to inflamed or irritated mucus membranes, to oral cavities or similar areas to produce anesthesia in and adjacent the area of application. The composition for topical application may be an aqueous solution, a cream or ointment, or an emulsion.

The following two formulations illustrate two ointments suitable for topical application.

OINTMENT A

A mixture 200 gms. polyethyleneglycol solid (molecular weight 4000) and 300 gms. polyethyleneglycol liquid (molecular weight 400) was heated to 60° C. To this was added 10 gms. of β-diethylaminoethyl 2-butoxy-3-naphthoamide hydrochloride and the mixture heated to 80° until the anesthetic was in solution. It was then cooled while stirring and filled in jars.

OINTMENT B

Petrolatum, 500 gms., was warmed to 60° C. and 10 gms. of β-diethylaminoethyl 2-butoxy-3-naphthoamide (base) was added. The mixture was heated to 75° C. then allowed to cool to room temperature with occasional stirring. It was then filled in jars.

The anesthetic compositions may comprise a vehicle and at least one of the substituted amide bases or salts of the bases. The vehicle may be any compatible diluent which does not react with the anesthetic. The vehicle may include other ingredients for special purposes, for example, water, oil, grease, wetting agent, solvent, dispersing or suspending agent and the like or mixtures thereof. In the anesthetic compositions, the vehicle may include preservative and buffers and may include other therapeutic compounds which may or may not also produce anesthesia.

We claim:

1. An anesthetic composition comprising from 0.05% to 15% by weight of anesthetic selected from the group consisting of substituted amide base and acid salts of the base, the remainder of the composition being a sterile pharmaceutical vehicle and the substituted amide base having the following structural formula:

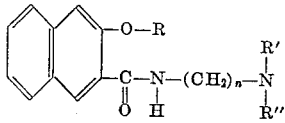

where

R is a radical selected from the group consisting of H and alkyl radicals containing from 1 up to and including 6 carbon atoms.

R' is a radical selected from the group consisting of H and alkyl radicals containing from 1 up to and including 4 carbon atoms, R" is an alkyl radical containing from 1 up to and including 4 carbon atoms, and n is an integer selected from the group consisting of 2 and 3.

2. An anesthetic composition comprising from 0.05% to 15% by weight of anesthetic selected from the group consisting of substituted amide base and acid salts of the base, the remainder of the composition being a sterile pharmaceutical carrier and the substituted amide base having the following structural formula:

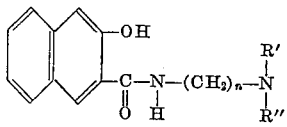

where

R' is a radical selected from the group consisting of H and alkyl radicals containing from 1 up to and including 4 carbon atoms, R" is an alkyl radical containing from 1 up to and including 4 carbon atoms, and n is an integer selected from the group consisting of 2 and 3.

3. An anesthetic composition comprising from 0.05% to 15% by weight of anesthetic selected from the group consisting of substituted amide base and acid salts of the base, the remainder of the composition being a sterile pharmaceutical carrier and the substituted amide base having the following structural formula:

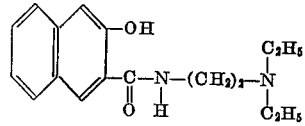

4. An anesthetic composition comprising from 0.05% to 15% by weight of anesthetic selected from the group consisting of substituted amide base and acid salts of the base, the remainder of the composition being a sterile pharmaceutical carrier and the substituted amide base having the following structural formula:

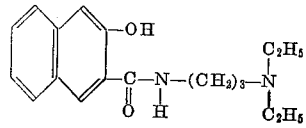

5. An anesthetic composition comprising from 0.05% to 15% by weight of anesthetic selected from the group consisting of substituted amide base and acid salts of the base, the remainder of the composition being a sterile pharmaceutical carrier and the substituted amide base having the following structural formula:

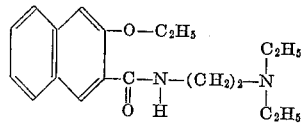

6. An anesthetic composition comprising from 0.05% to 15% by weight of anesthetic selected from the group consisting of substituted amide base and acid salts of the base, the remainder of the composition being a sterile pharmaceutical carrier and the substituted amide base having the following structural formula:

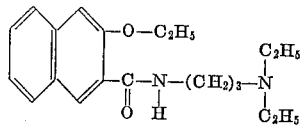

7. An anesthetic composition comprising from 0.05% to 15% by weight of diethylaminoethyl 2-hydroxy-3-naphthoamide with the remainder of the composition being a sterile pharmaceutical carrier.

8. An anesthetic composition comprising from 0.05% to 15% by weight of anesthetic selected from the group consisting of amide base and acid salts of the base, the remainder of the composition being a sterile pharmaceutical carrier and the base having the following structural formula:

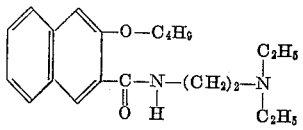

References Cited in the file of this patent

UNITED STATES PATENTS 1,825,623     Miescher _____ Sept. 29, 1931

FOREIGN PATENTS 453,437     Great Britain _____ Sept. 7, 1936

OTHER REFERENCES

Moore: Journal of the American Pharmaceutical Assn., vol. 33, July 1944, p. 198. (Copy in Sci. Libr.)

Blicke: Journal of the American Chemical Society, vol. 62, December 1940, pp. 3316 to 3319. (Copy in Sci. Libr.)

New and Nonofficial Remedies (1951), pp. 33, 34. (Copy in Div. 43.)